US010144452B2

(12) United States Patent
Lavoie

(10) Patent No.: US 10,144,452 B2
(45) Date of Patent: Dec. 4, 2018

(54) ACTIVE ADAPTIVE HAPTIC MULTI-FUNCTION KNOB

(71) Applicant: Ford Global Technologies, LLC, Dearbron, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 14/878,227

(22) Filed: Oct. 8, 2015

(65) Prior Publication Data

US 2017/0101130 A1 Apr. 13, 2017

(51) Int. Cl.
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 19/00 | (2011.01) |
| B62D 13/06 | (2006.01) |
| B62D 1/02 | (2006.01) |

(52) U.S. Cl.
CPC ............ B62D 13/06 (2013.01); B62D 1/02 (2013.01)

(58) Field of Classification Search
CPC .................................. B62D 13/06; B62D 1/02
See application file for complete search history.

(56) References Cited

U.S. PATENT DOCUMENTS

| 2,050,948 A | * | 8/1936 | Hekking | ............... B62D 13/00 116/28 R |
| 3,944,972 A | | 3/1976 | Chandler | |
| 4,320,267 A | | 3/1982 | Greve et al. | |
| 4,518,044 A | | 5/1985 | Wiegardt et al. | |
| 4,761,588 A | * | 8/1988 | Youcef-Toumi | ....... G05B 19/39 318/46 |

(Continued)

FOREIGN PATENT DOCUMENTS

| DE | 3923676 A1 | 1/1991 |
| DE | 3931518 A1 | 4/1991 |

(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

*Primary Examiner* — Jean Paul Cass
(74) *Attorney, Agent, or Firm* — Frank MacKenzie; Price Heneveld LLP

(57) ABSTRACT

A backup assist system for a vehicle reversing a trailer includes an input element, including a base and a rotary element rotatably coupled with the base. The system further includes a controller causing a rotation of the rotary element relative to the base to be constrained in a first rotational movement mode that is biased toward a center position. The controller further interprets a first instantaneous position of the rotary element as a trailer control commanding position and outputs a vehicle steering command based thereon.

20 Claims, 10 Drawing Sheets

(56) References Cited

U.S. PATENT DOCUMENTS

| | | | |
|---|---|---|---|
| 4,848,499 A | 7/1989 | Martinet et al. | |
| 4,947,097 A | 8/1990 | Tao | |
| 5,261,495 A | 11/1993 | Szymczak | |
| 5,270,689 A | 12/1993 | Hermann | |
| 5,313,389 A | 5/1994 | Yasui | |
| 5,359,165 A | 10/1994 | Leveque et al. | |
| 5,430,261 A | 7/1995 | Malone | |
| 5,436,413 A | 7/1995 | Katakami | |
| 5,474,062 A * | 12/1995 | DeVires | A61M 16/00 128/204.18 |
| 5,494,028 A * | 2/1996 | DeVries | A61M 16/00 128/204.18 |
| 5,957,232 A | 9/1999 | Shimizu et al. | |
| 6,389,342 B1 | 5/2002 | Kanda | |
| 6,601,386 B1 | 8/2003 | Hori et al. | |
| 6,636,197 B1 | 10/2003 | Goldenberg et al. | |
| 6,750,406 B2 | 6/2004 | Komatsu et al. | |
| 7,038,667 B1 | 5/2006 | Vassallo et al. | |
| 7,085,634 B2 | 8/2006 | Endo et al. | |
| 7,191,865 B2 | 3/2007 | Spark | |
| 7,225,891 B2 | 6/2007 | Gehring et al. | |
| 7,255,061 B2 | 8/2007 | Denton | |
| 7,309,075 B2 | 12/2007 | Ramsey et al. | |
| 7,310,084 B2 | 12/2007 | Shitanaka et al. | |
| 7,315,299 B2 | 1/2008 | Sunda et al. | |
| 7,436,298 B2 | 10/2008 | Yuasa et al. | |
| 7,469,161 B1 * | 12/2008 | Gandhi | A61N 1/3708 128/897 |
| 7,550,686 B2 | 6/2009 | Girke et al. | |
| 7,827,917 B1 | 11/2010 | Henderson | |
| 7,837,004 B2 | 11/2010 | Yasuda | |
| 7,983,817 B2 * | 7/2011 | Breed | B60N 2/002 250/578.1 |
| 8,036,792 B2 | 10/2011 | Dechamp | |
| 8,054,203 B2 * | 11/2011 | Breed | B60C 11/24 340/425.5 |
| 8,138,865 B2 | 3/2012 | North et al. | |
| 8,436,489 B2 * | 5/2013 | Stahlkopf | F01K 13/02 307/43 |
| 8,519,948 B2 | 8/2013 | Cruz-Hernandez et al. | |
| 8,755,984 B2 | 6/2014 | Rupp et al. | |
| 8,786,417 B2 | 7/2014 | Holmen et al. | |
| 8,798,860 B2 | 8/2014 | Dechamp | |
| 8,825,328 B2 | 9/2014 | Rupp et al. | |
| 8,909,426 B2 | 12/2014 | Rhode et al. | |
| 8,930,140 B2 | 1/2015 | Trombley et al. | |
| 8,948,442 B2 * | 2/2015 | Breed | B60R 1/00 382/100 |
| 8,972,109 B2 | 3/2015 | Lavoie et al. | |
| 9,033,284 B2 * | 5/2015 | Van Staagen | B64C 13/04 244/122 R |
| 9,102,220 B2 * | 8/2015 | Breed | B60R 21/0132 |
| 9,102,271 B2 | 8/2015 | Trombley et al. | |
| 9,108,598 B2 | 8/2015 | Headley | |
| 9,132,856 B2 | 9/2015 | Shepard | |
| 9,164,955 B2 | 10/2015 | Lavoie et al. | |
| 9,187,124 B2 | 11/2015 | Trombley et al. | |
| 9,238,483 B2 * | 1/2016 | Hafner | B62D 13/06 |
| 9,248,858 B2 | 2/2016 | Lavoie et al. | |
| 9,290,146 B2 * | 3/2016 | Breed | B60R 21/01536 |
| 9,315,212 B1 | 4/2016 | Kyrtsos et al. | |
| 9,321,483 B2 | 4/2016 | Headley | |
| 9,335,162 B2 | 5/2016 | Kyrtsos et al. | |
| 9,340,228 B2 | 5/2016 | Ku et al. | |
| 9,352,777 B2 | 5/2016 | Lavoie et al. | |
| 9,434,414 B2 | 9/2016 | Lavoie | |
| 9,708,000 B2 * | 7/2017 | Hafner | B62D 13/06 |
| 2003/0183438 A1 * | 10/2003 | Higashi | B62D 1/00 180/315 |
| 2004/0093139 A1 | 5/2004 | Wildey et al. | |
| 2004/0189595 A1 | 9/2004 | Yuasa et al. | |
| 2005/0000738 A1 | 1/2005 | Gehring et al. | |
| 2006/0076828 A1 * | 4/2006 | Lu | B60T 8/1755 303/146 |
| 2006/0092129 A1 | 5/2006 | Choquet et al. | |
| 2007/0006970 A1 * | 1/2007 | Such | B27D 5/003 156/324 |
| 2007/0198190 A1 | 8/2007 | Bauer et al. | |
| 2008/0030361 A1 | 2/2008 | Peissner et al. | |
| 2008/0312792 A1 | 12/2008 | Dechamp | |
| 2009/0101429 A1 | 4/2009 | Williams | |
| 2009/0306854 A1 | 12/2009 | Dechamp | |
| 2010/0063670 A1 | 3/2010 | Brzezinski et al. | |
| 2010/0152989 A1 | 6/2010 | Smith et al. | |
| 2010/0222964 A1 | 9/2010 | Dechamp | |
| 2011/0149077 A1 | 6/2011 | Robert | |
| 2011/0160956 A1 | 6/2011 | Chung et al. | |
| 2011/0248115 A1 * | 10/2011 | Proia | B60G 17/016 244/50 |
| 2012/0030626 A1 | 2/2012 | Hopkins et al. | |
| 2012/0087480 A1 | 4/2012 | Yang et al. | |
| 2012/0271512 A1 | 10/2012 | Rupp et al. | |
| 2012/0271514 A1 | 10/2012 | Lavoie et al. | |
| 2012/0271515 A1 | 10/2012 | Rhode et al. | |
| 2012/0271522 A1 | 10/2012 | Rupp et al. | |
| 2013/0006472 A1 | 1/2013 | McClain et al. | |
| 2013/0024064 A1 | 1/2013 | Shepard | |
| 2013/0158803 A1 | 6/2013 | Headley | |
| 2013/0158863 A1 | 6/2013 | Skvarce et al. | |
| 2013/0162418 A1 * | 6/2013 | Frayman | B64C 13/10 340/407.2 |
| 2013/0268160 A1 | 10/2013 | Trombley et al. | |
| 2014/0052337 A1 | 2/2014 | Lavoie et al. | |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0088797 A1 | 3/2014 | McClain et al. | |
| 2014/0156176 A1 | 6/2014 | Kikuchi | |
| 2014/0160276 A1 | 6/2014 | Pliefke et al. | |
| 2014/0172232 A1 | 6/2014 | Rupp et al. | |
| 2014/0188344 A1 | 7/2014 | Lavoie | |
| 2014/0188346 A1 | 7/2014 | Lavoie | |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0267868 A1 | 9/2014 | Mazzola et al. | |
| 2014/0267868 A1 | 9/2014 | Sawa | |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0309888 A1 | 10/2014 | Smit et al. | |
| 2014/0324295 A1 | 10/2014 | Lavoie | |
| 2014/0343795 A1 | 11/2014 | Lavoie | |
| 2014/0379217 A1 | 12/2014 | Rupp et al. | |
| 2015/0057903 A1 | 2/2015 | Rhode et al. | |
| 2015/0066296 A1 | 3/2015 | Trombley et al. | |
| 2015/0070161 A1 | 3/2015 | Mizuno et al. | |
| 2015/0120141 A1 | 4/2015 | Lavoie et al. | |
| 2015/0134183 A1 | 5/2015 | Lavoie et al. | |
| 2015/0138340 A1 | 5/2015 | Lavoie | |
| 2015/0158527 A1 | 6/2015 | Hafner et al. | |
| 2015/0203156 A1 | 7/2015 | Hafner et al. | |
| 2015/0210317 A1 | 7/2015 | Hafner et al. | |
| 2015/0217693 A1 * | 8/2015 | Pliefke | B60R 1/00 348/118 |
| 2016/0039456 A1 | 2/2016 | Lavoie et al. | |
| 2016/0059888 A1 | 3/2016 | Bradley et al. | |
| 2016/0059889 A1 | 3/2016 | Herzog et al. | |
| 2016/0096549 A1 * | 4/2016 | Herzog | B62D 13/06 701/41 |
| 2016/0129939 A1 * | 5/2016 | Singh | B62D 13/06 701/41 |
| 2016/0152263 A1 * | 6/2016 | Singh | B60T 8/1708 701/41 |
| 2016/0280267 A1 | 9/2016 | Lavoie et al. | |
| 2016/0304122 A1 | 10/2016 | Herzog et al. | |

(56) References Cited

U.S. PATENT DOCUMENTS

| | | | | |
|---|---|---|---|---|
| 2016/0375923 A1* | 12/2016 | Schulz | .................... | B62D 1/02 |
| | | | | 74/493 |
| 2017/0101130 A1* | 4/2017 | Lavoie | .................... | B62D 1/02 |
| 2017/0113722 A1* | 4/2017 | Lavoie | ................... | G08G 1/168 |

FOREIGN PATENT DOCUMENTS

| | | |
|---|---|---|
| DE | 9208595 U1 | 8/1992 |
| DE | 10154612 A1 | 5/2003 |
| DE | 102005043467 A1 | 3/2007 |
| DE | 102006002294 A1 | 7/2007 |
| DE | 102008004160 A1 | 8/2009 |
| DE | 102009012253 A1 | 9/2010 |
| DE | 102010021052 A1 | 11/2011 |
| DE | 102010029184 A1 | 11/2011 |
| DE | 102013000198 A1 | 7/2014 |
| EP | 0418653 A1 | 3/1991 |
| EP | 1653490 A1 | 5/2006 |
| EP | 1810913 A1 | 7/2007 |
| EP | 2388180 A2 | 11/2011 |
| EP | 1569073 B1 | 9/2014 |
| GB | 2398048 A | 8/2004 |
| GB | 2398049 A | 8/2004 |
| GB | 2398050 A | 8/2004 |
| JP | 2003045269 A | 2/2003 |
| JP | 2003175852 A | 6/2003 |
| JP | 2007186118 A | 7/2007 |
| KR | 20140105199 A | 9/2014 |
| WO | 0044605 A1 | 8/2000 |

* cited by examiner

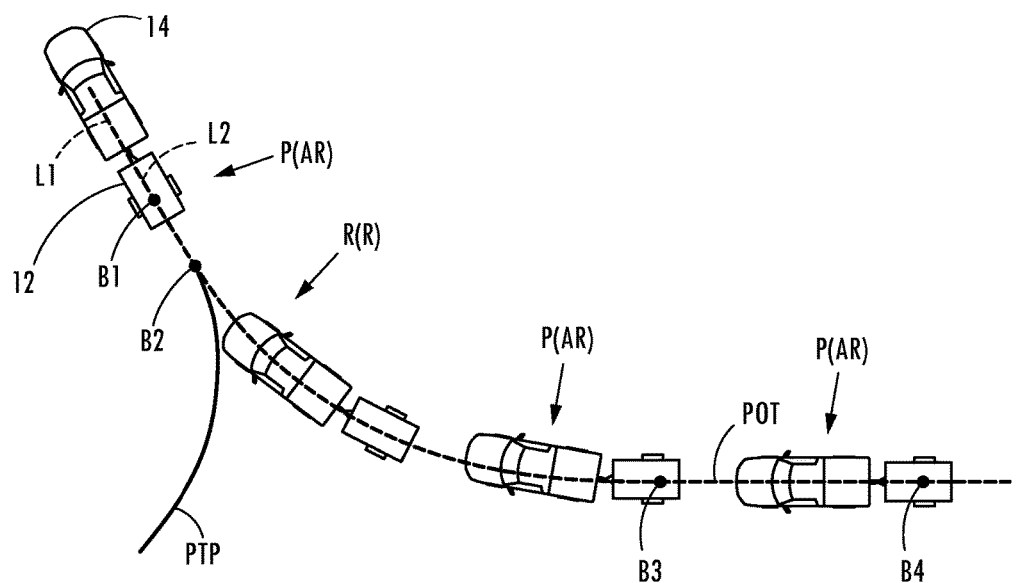
FIG. 7
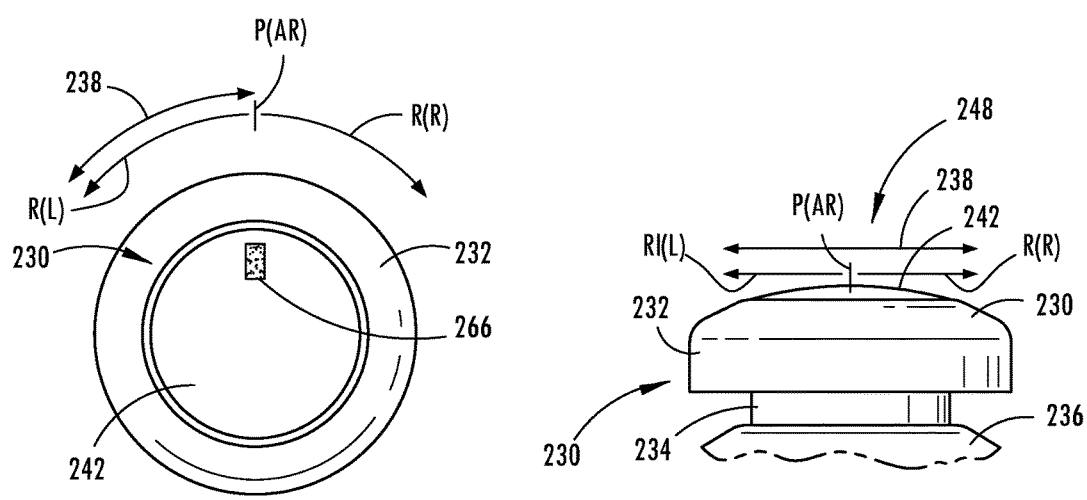
FIG. 8A  FIG. 8B

ACTIVE ADAPTIVE HAPTIC MULTI-FUNCTION KNOB

FIELD OF THE INVENTION

The disclosures made herein relate generally to steering assist technologies in vehicles and, more particularly, to trailer backup assist system having a rotatable driver interface for controlling a radius of curvature for a trailer path.

BACKGROUND OF THE INVENTION

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner, which can result in such systems having a fairly complex human machine interface (HMI) and vehicle/trailer position determination.

Therefore, an approach for backing a trailer that provides a simple human machine interface and that overcomes other shortcomings of known trailer backup assist systems would be advantageous, desirable and useful.

SUMMARY OF THE INVENTION

According to one aspect of the present invention, a steering input system for a trailer backup assist system includes an input element having a base, a rotary element rotatably coupled with the base, and an electromechanical element coupled between the base and the rotary element. A controller is further included in the system and causes the electromechanical element to constrain the rotary element to a first rotational movement mode that is biased toward a center position of the rotary element with respect to the base.

According to another aspect of the present invention, a backup assist system for a vehicle reversing a trailer includes an input element, including a base and a rotary element rotatably coupled with the base. The system further includes a controller causing a rotation of the rotary element relative to the base to be constrained in a first rotational movement mode that is biased toward a center position. The controller further interprets a first instantaneous position of the rotary element as a trailer control commanding position and outputs a vehicle steering command based thereon.

According to another aspect of the present invention, a method for assisting a vehicle in reversing a trailer includes causing a rotation of a rotary element relative to a base to which the rotary element is coupled to be constrained in a first rotational movement mode that is biased toward a center position. The method further includes receiving a curvature command provided by the rotary element and generating a steering command for the vehicle based on a degree of curvature corresponding to the curvature command.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a schematic diagram showing a backup sequence of a vehicle and a trailer implementing various curvature selections with the trailer backup assist system, according to one embodiment;

FIG. 8A is a top view of a variation of the rotatable knob for the trailer backup steering input apparatus of FIG. 5;

FIG. 8B is a front elevation view of the rotatable knob of FIG. 8A;

DETAILED DESCRIPTION OF THE PREFERRED EMBODIMENTS

Figure 1:
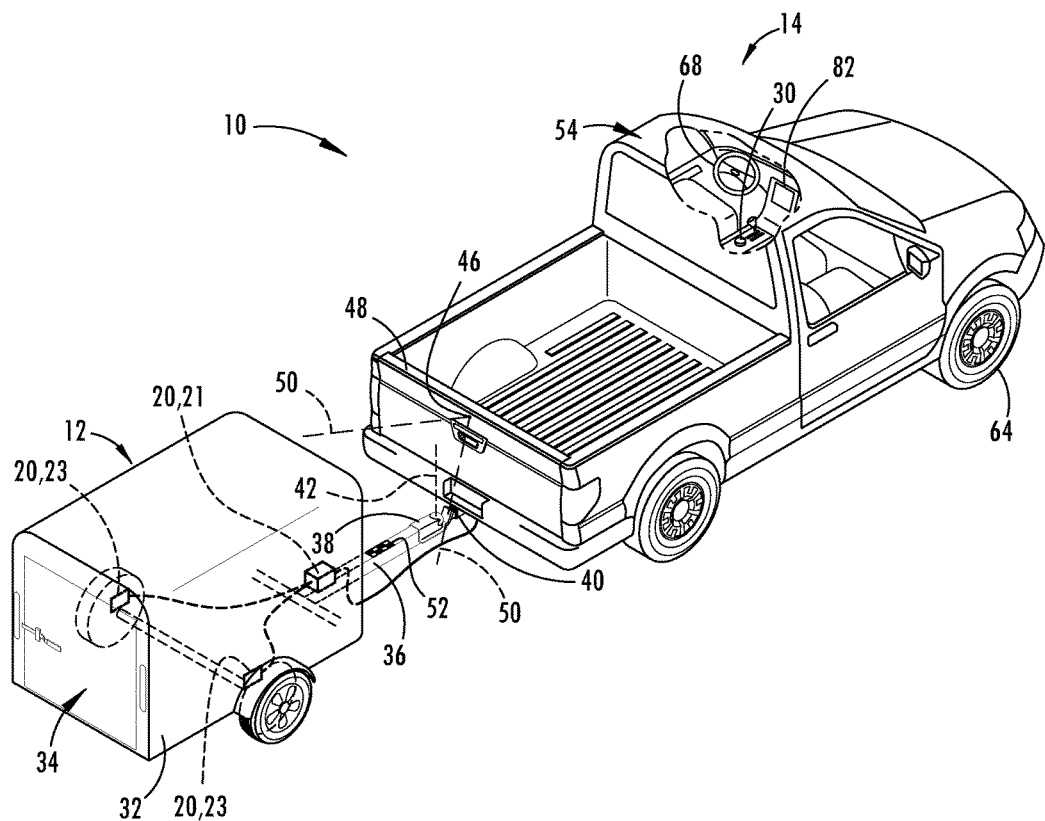
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-12, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10 according to such an embodiment may also include a vehicle sensor system 16 that generates a vehicle yaw rate $\omega_1$ and a vehicle speed $v_1$. The controller 28 of the trailer backup assist system 10 may thereby estimates a hitch angle γ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may include a hitch angle sensor 44, such as a vision-based system that employs a camera 46 on the vehicle 14 to monitor a target 52 on the trailer 12 to determine the hitch angle γ and thereby further increase reliability of the overall estimated hitch angle γ.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilizes processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
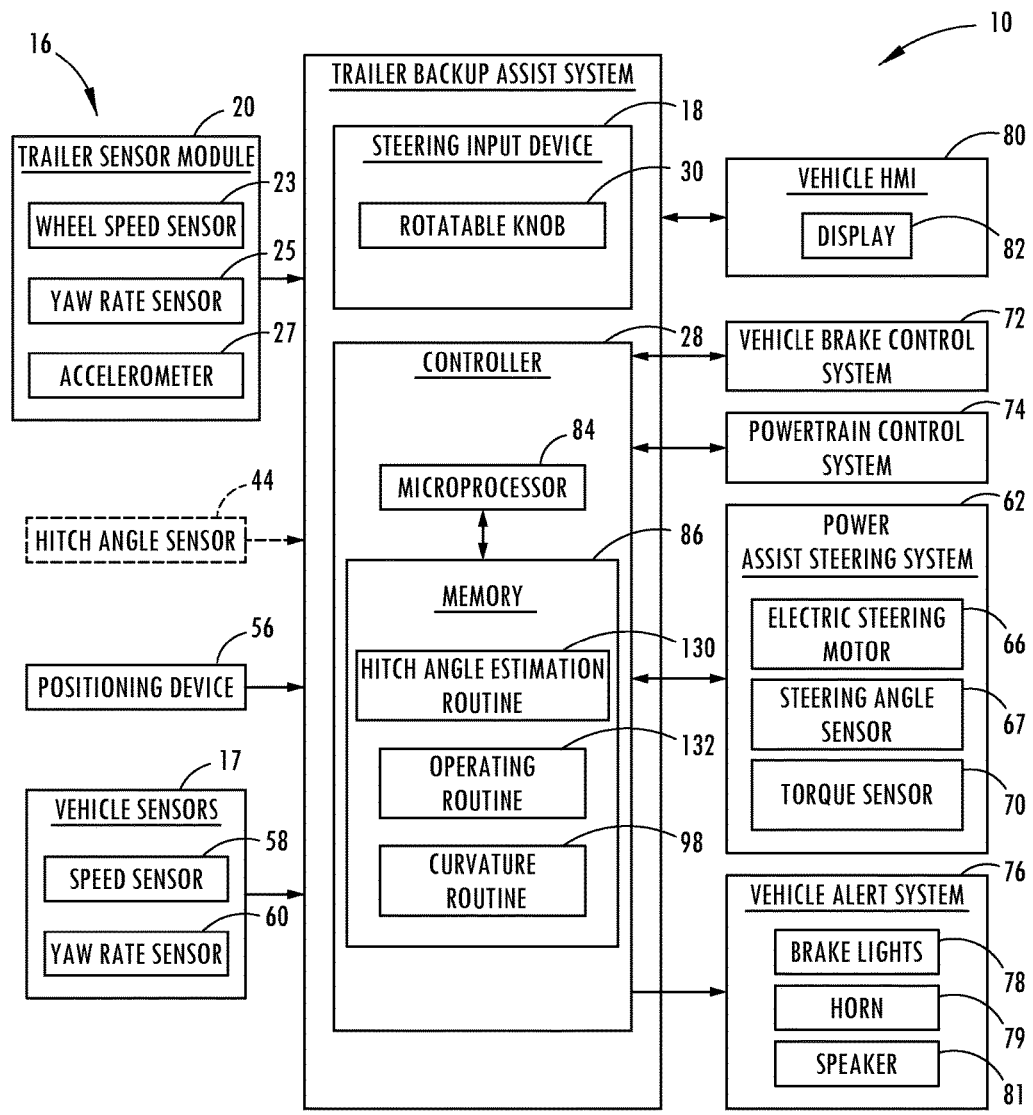
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 is provided in dashed lines to illustrate that in some embodiments it may be omitted when the trailer sensor module 20 is provided. The illustrated embodiment of the trailer backup assist system 10 receives vehicle and trailer status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
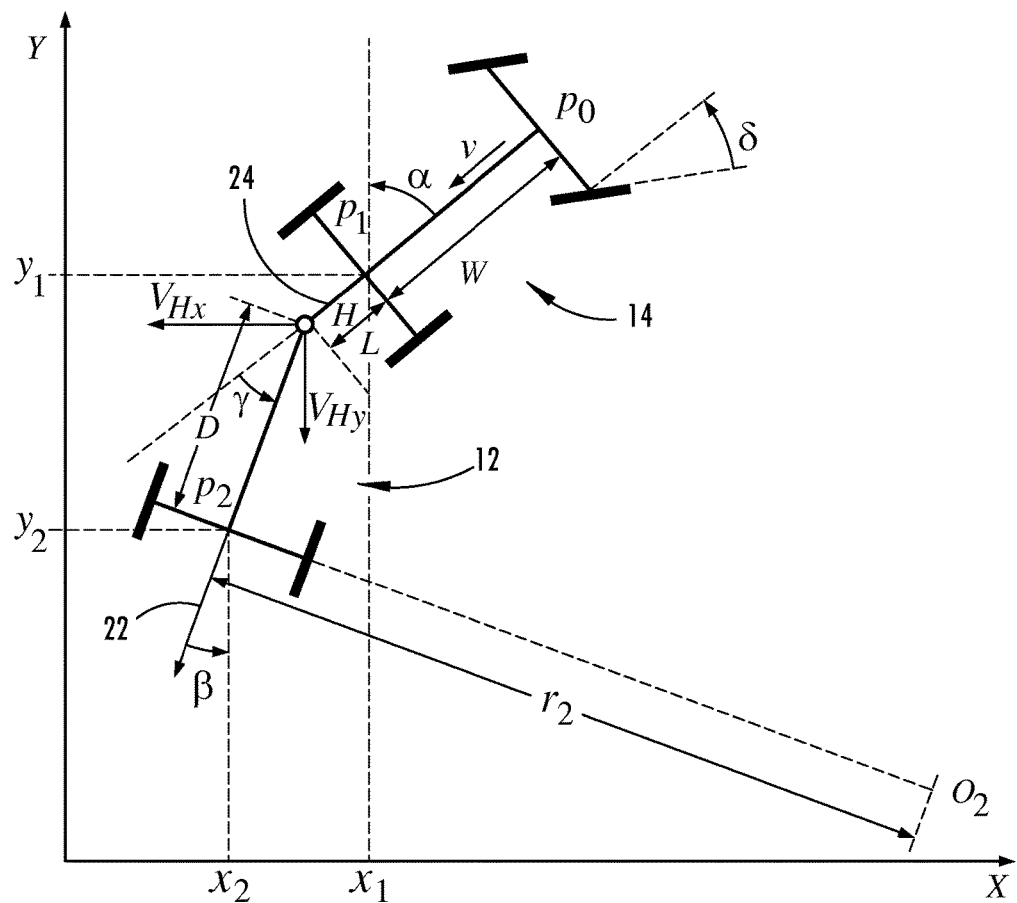
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

$\delta$: steering angle at steered front wheels of the vehicle;
$\alpha$: yaw angle of the vehicle;
$\beta$: yaw angle of the trailer;
$\gamma$: hitch angle ($\gamma=\beta-\alpha$);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ is can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle $\delta$ as a function of trailer path curvature $\kappa_2$ and hitch angle $\gamma$.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
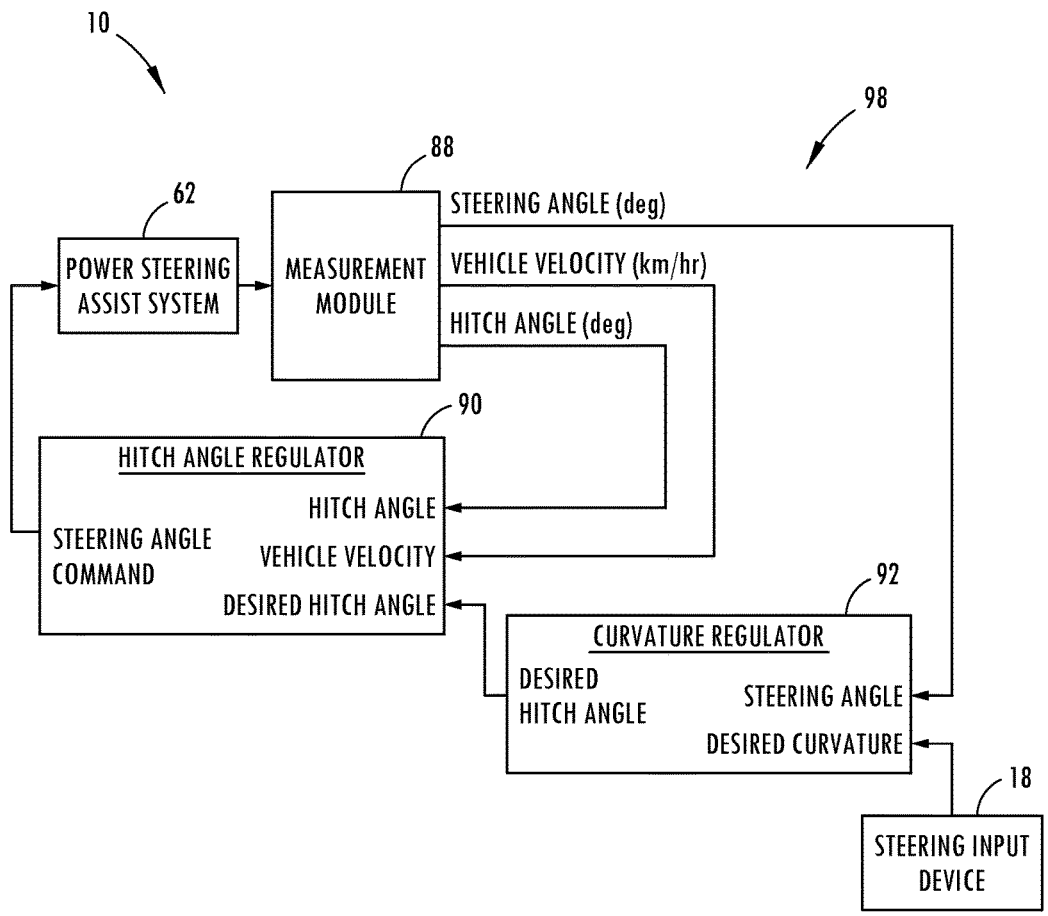
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle $\gamma(d)$ based on the current desired curvature $\kappa_2$ along with the steering angle $\delta$ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

$\delta$ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

The output hitch angle of $p(\kappa_2, \delta)$ is provided as the reference signal, $\gamma_{ref}$, for the remainder of the control system, although the steering angle δ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

The feedback control law, $g(u, \gamma, v)$, is implemented with a proportional integral (PI) controller, whereby the integral portion substantially eliminates steady-state tracking error. More specifically, the control system illustrated in FIG. 5 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller or otherwise determined by the trailer backup assist system 10, as disclosed in greater detail herein.

Figure 5:
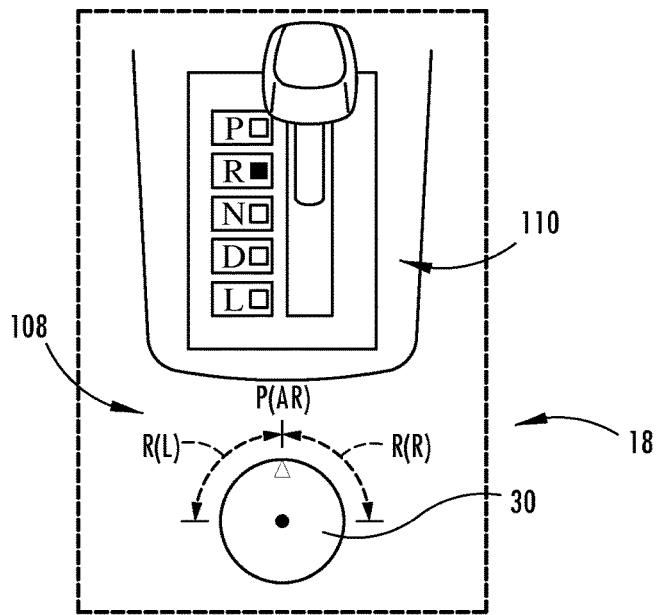
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
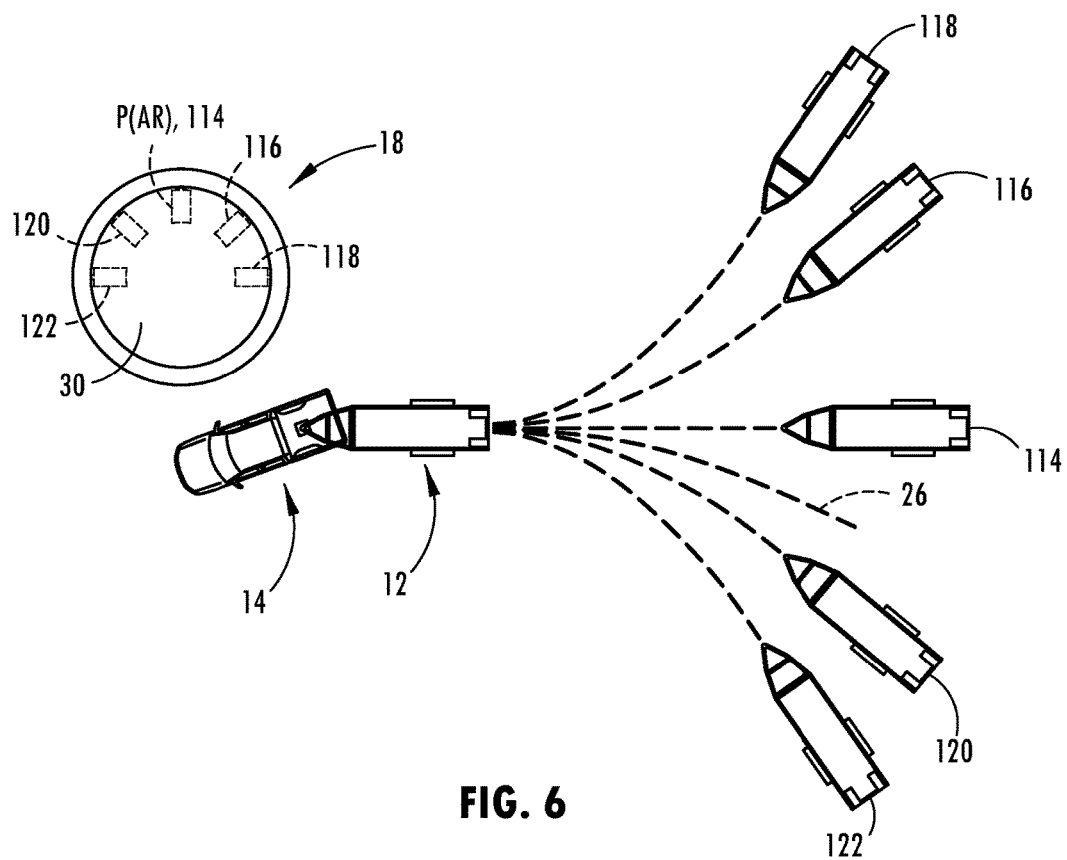
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIG. 6, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a torque that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR), which itself may correspond to a zero-curvature command. It is also contemplated that the rate of rotation of the rotatable knob 30 may also be used to determine the desired curvature 26 output to the controller 28. The at-rest position P(AR) of the knob corresponds to a signal indicating that the vehicle 14 should be steered such that the trailer 12 is backed along a substantially straight backing path 114 (FIG. 6) (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 in the corresponding direction that is possible without the corresponding vehicle steering information causing a jackknife condition.

As shown in FIG. 6, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Referring to FIG. 7, an example is shown in which the steering input device 18 is used for dictating a curvature of a desired backing path of travel (POT) of the trailer 12 while backing up the trailer 12 with the vehicle 14. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position within clockwise rotation range R(R)). Accordingly, the trailer backup assist system 10 will steer the vehicle 14 in a manner determined for causing the trailer 12 to be steered to the right as a function of an amount of rotation of the rotatable knob 30 with respect to the at-rest position P(AR), a rate movement of the knob 30 (FIG. 5), and/or a direction of movement of the knob with respect to the at-rest position P(AR). Similarly, the trailer 12 can be commanded to steer to the left by rotating the rotatable knob 30 to the left.

When the trailer 12 reaches backup position B3, the driver allows the rotatable knob 30 to return to the at-rest position P(AR) thereby causing the trailer backup assist system 10 to steer the vehicle 14 in a manner determined to cause the trailer 12 to be backed into and along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 230 is in/returned to the at-rest position P(AR).

In the embodiment illustrated in FIG. 7, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Turning now to FIGS. 8A and 8B, a further embodiment of a control knob 230 is illustrated that can be used to control vehicle 14 in reversing a trailer 12 based on a trailer control command, such as along a curvature path 26 by adjusting the desired trailer control command according to a particular, selectable command position. In an embodiment, the trailer control command may be a particular curvature path 26 according to the manner discussed above with respect to FIGS. 5-7. In particular, knob 230 can be used to adjust curvature path 26 by turning a control element 232 thereof, against a biasing torque, away from the at rest position P(AR) within either the left range of motion R(L) or a right range of motion R(R) extending away therefrom. Such a knob 230 can also be used in this manner to adjust a controlled hitch angle γ of trailer 12 relative to vehicle 14 using the same type of center-biased movement in connection with a backup assist system that is angle-based, rather than curvature based. As discussed further below, knob 230 may also provide for rotation and/or other movement thereof according to additional movement modes that may allow knob 230 to be used in connection with other inputs and systems within vehicle 14. As illustrated, such movement modes may include the aforementioned biased rotation toward and away from the at rest position P(AR), which is shown in the present embodiment as being a rotation of an embodiment of control element 232 that is in the form of a generally annular ring positioned about or around a body 234 to which control element 232 is coupled. In an example, one such additional movement mode provided by knob 230 includes free rotation of control element 232 about body 234, as illustrated by arrow 238.

Figure 9:
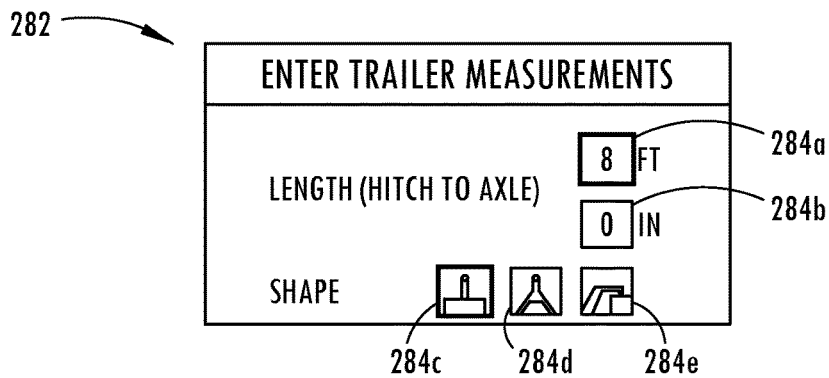
FIG. 9 is a view of a user interface with which the rotatable knob can be used to enter various trailer parameter information.
Figure 10:
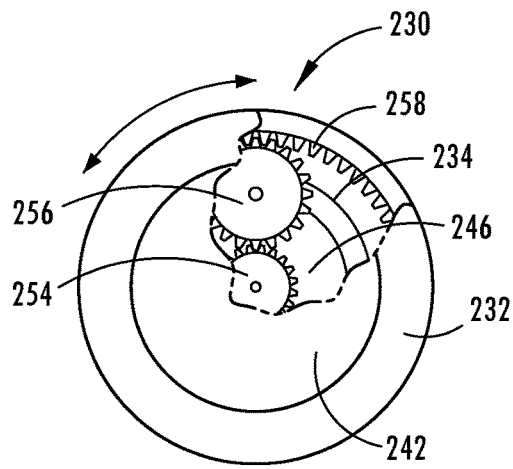
FIG. 10 is a top, partial cutaway view of the rotatable knob of FIG. 8A.

As shown in FIG. 9, the various movement modes may be used to navigate within certain menus within a display 282 (which may be related to system 10, as well as additional vehicle systems and operation, such as climate-control, multimedia, etc.), as well as among menu items 284, and to input various information presented on display 282. In the example shown in FIG. 9, display 282 may present an interface allowing a user to input various parameters related to the trailer 12 associated therewith, for storage in memory (e.g. memory 86, as shown in FIG. 2) for use in a curvature routine 98, as discussed above. In the example shown, the display 282 may be configured to allow the user to enter the length of trailer 12, including by inputting the feet component of the length in menu item 284a, which can be done by free rotation 238 of control element 232 in, for example, the clockwise direction to increase the input value or in the anti-clockwise to decrease the value. In this manner, the user can confirm the entered value in menu item 284a, for example, by depressing button 242 and by navigating to the subsequent menu item 284b (in which the user inputs the inch component of the measurement) by free rotation 238 of knob 230 to advance the contextual menu item. Similar manipulation of knob 230 can be used to input the inch value and to, for example, select among various additional menu items 284c, 284d, and 284e to select an appropriate trailer shape, or for entry of other relevant trailer parameters. Control knob 230 can be used in a similar manner to select among menu items that may relate to systems of vehicle 14 outside of the trailer backup assist system 10 described elsewhere herein. In one example, a user may select between actions to be taken in response to an incoming call being received, information for which may be presented to a user on the same display 282 that is used to display information related to system 10.

Figure 11:
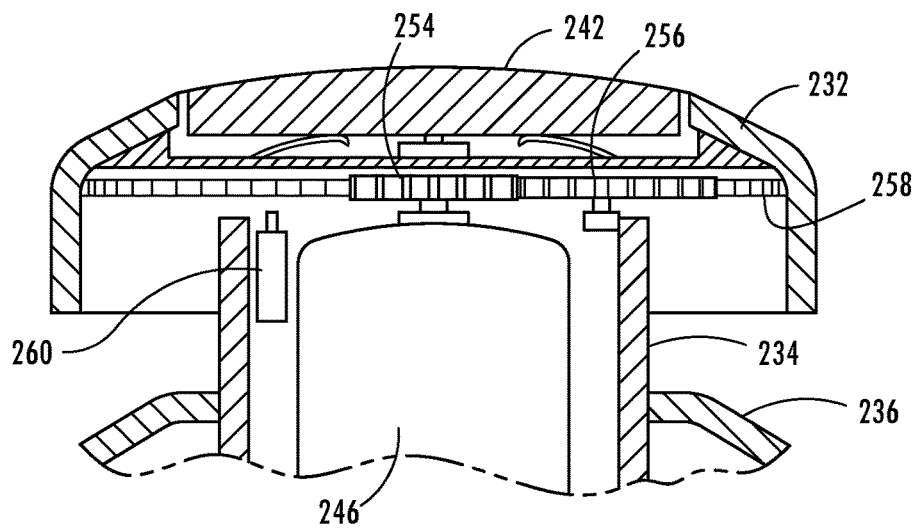
FIG. 11 is a side cross-sectional view of a variation of the rotatable knob of FIG. 8A showing various internal components thereof.

The above-described movement modes may be realized by an internal electromechanical element 246 that can be controlled to optionally implement a simulated biasing action for control element 232 with respect to body 234 and, thusly, restrict the movement of control element 232 to within the second movement mode 238. As discussed herein, an electromechanical element can be any device or element that uses an electrical current to achieve a mechanical or physical action. In an example, electromechanical element 246 may include a motor, as depicted in FIG. 11, alone or in combination with other mechanical elements, such as various linkages, springs, gears 254, and the like, which may be arranged to replicate the effects of various other physical coupling between control element 232 and body 234. In the embodiment illustrated, an electromechanical element in the form of a motor includes an output gear 254 coupled therewith that is in an operative mesh engagement with an intermediate gear 256 that itself meshes with a plurality of gear teeth 258 disposed along an interior of control element 232. Alternatively, an electromechanical element include a plurality of electromagnets, or the like, alone or in combination with other fixed magnets, other mechanical elements, such as various linkages, springs, gears, and the like, which may be arranged to replicate the effects of various other physical coupling between control element 232 and body 234.

Electromechanical element 246 may be configured to permit free rotation 238 of control element 232 with respect to body 234 in one mode and to replicate a spring-biased movement of control element 232 toward an at rest position P(AR) in another mode. In one example, this may be achievable using electronic circuitry to control electromechanical element 246, and may further be implemented without physical reconfiguration of any of the components thereof. In one example, such a change may be achieved upon the activation of curvature routine 98 by electronic circuitry associated with knob 230 (which may include controller 28 or the like). The movement provided by the controlled electromechanical element 246 may provide for tactile feedback to the user of knob 230 to indicate the current movement mode of knob 230 or to otherwise correspond to the type of interaction called for by the particular instantaneous use of knob 230. In the example of FIGS. 12-15, a simulated spring-biased movement can be implemented by electromechanical element 246 in which electromechanical element 246 is controlled in such a manner so as to reproduce the effect of control element 232 being coupled to body 234 by a spring that is configured to bias movement of control element 232 toward the at rest position P(AR). This can be implemented by the associated controller (e.g. controller 28) increasing a torque provided by electromechanical element 246 to control element 232 in a direction to oppose a torque provided on control element 232 in a direction away from the at-rest position P(AR). This torque can be made to increase with increasing rotation of control knob 230 from the at rest position P(AR) (and vice versa) and can be implemented in one example using a proportional integral control scheme.

In an example, the transition between movement modes can be made automatically, such as by controller 28, by directly altering the manner in which electromechanical element 246 operates. Such a transition can be made in response to the curvature routine 98 being initiated by a user, either using a menu on HMI 80 (e.g., using knob 230 in the free-rotation mode) or by depressing button 242, as discussed above, and by deactivation of curvature routine 98, such as by depressing button 242 or navigating to an "exit" command using knob 230. To further aid in the usability of control element 232 in selection of menu items 284 to implement one or more vehicle system commands, such as described above with respect to FIG. 9, an embodiment of knob 230 using an electromechanical element 246 to control movement in the above described movement modes, may also implement a scheme to replicate the presence of radially-spaced physical detents at regular intervals, which may correspond to movement between successive menu items 284. In this respect, rotation of control element 232 can still be considered free rotation 238, the presence of such simulated detents notwithstanding, as such motion may still be permitted through indefinite revolutions of control element 232, without being limited in either direction and without being biased toward the at rest position P(AR).

Figure 12:
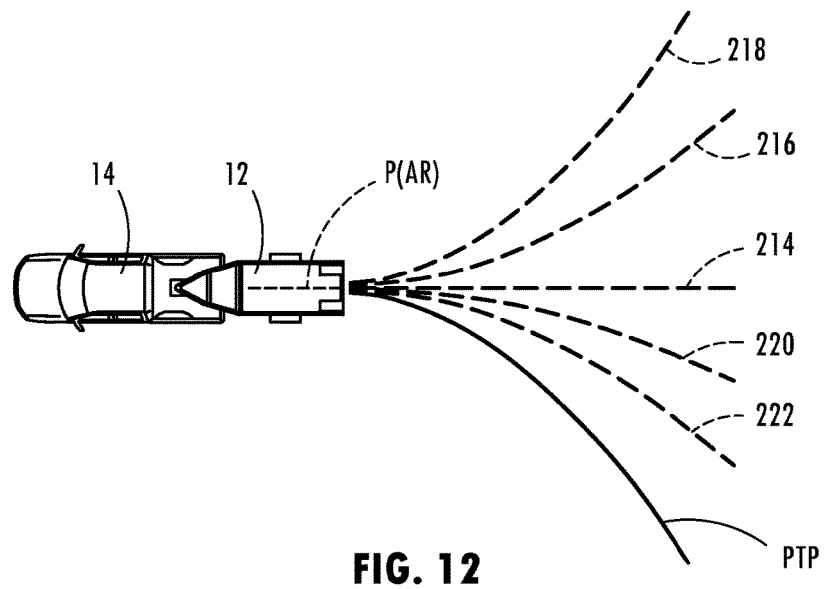
FIG. 12 is a schematic diagram showing a backup sequence of a vehicle and a trailer implementing various curvature selections with the trailer backup assist system, according to one embodiment.
Figure 13:
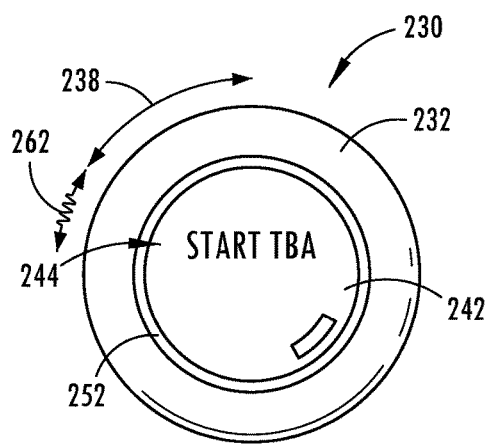
FIGS. 13 and 14 show the rotatable knob of FIG. 8A according to various movement modes for implementing a curvature control mode.
Figure 14:
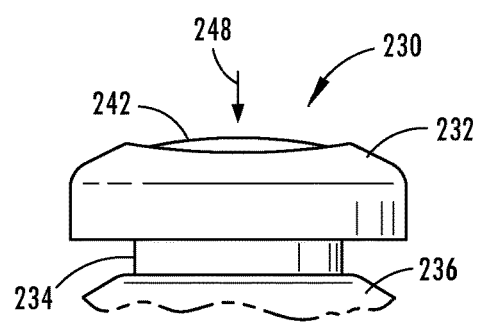

With reference to FIG. 12 control of vehicle 14 in reversing trailer 12 using an embodiment of knob 230 is described with reference to FIGS. 13-15. In particular, knob 230 can be used to navigate through various menus and screens, according to a particular sequence, to arrive at a menu within which the user is able to activate system 10. Such navigation can be done by free rotation 238 of control element 232. When the appropriate navigation has been achieved, button 242 may be depressed to activate the curvature routine 98 for reversing of trailer 12 using vehicle 14. As shown in FIG. 13, button 242 may be configured to indicate that system 10 is ready to start curvature routine 98, such as by illumination of status indicator 244. Once system 10 has been activated, controller 28 can cause electromechanical element 246 to change the movement mode of knob 230 into the aforementioned biased movement away from at rest position P(AR).

Figure 15:
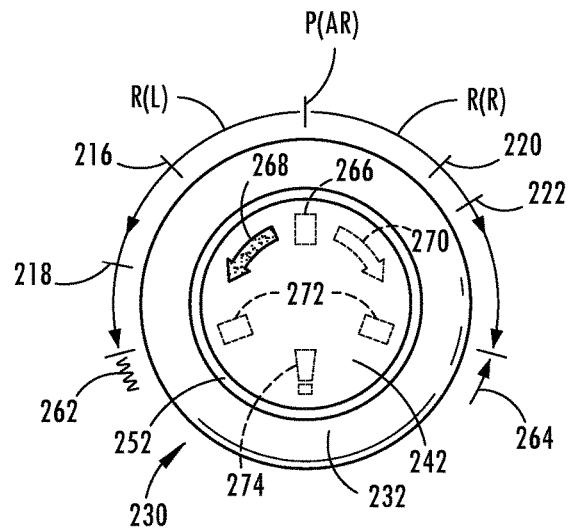
FIG. 15 shows the rotatable knob of FIG. 8A in use for selecting a curvature command.

As shown in FIG. 15, during control of curvature routine 98, control element 232 may be rotated away from the at rest position P(AR), such as within the left range of motion R(L) or the right range of motion R(R), with controller 28 interpreting the rotated position of control element 232 as a curvature command position. By way of example, such rotation can be to and/or among the indicated exemplary rotated directional positions 216, 218, 220, and 222, which include various directional positions opposed about the at rest position P(AR). The illustrated positions of control element 232 correspond to various adjusted curvature paths shown in FIG. 12. In this manner, and as further discussed above with reference to FIG. 6, controller 28 may, accordingly, control the steering of vehicle 14 to maintain trailer 12 along the desired path that corresponds to a particular instantaneous position of control element 232. As further shown in FIG. 15, an indicator 268 may be provided on button 242, for example, to indicate the direction of rotation of control element 232 (e.g. within the right range of motion R(R) and that the corresponding direction within which curvature path is implemented (i.e. corresponding to the instantaneous position of control element 232).

Additionally, knob 230 can be configured to communicate that the curvature corresponding to the rotated position of control element 232 can be implemented by system 10, such as according to the parameters discussed above, including based on a determination if the commanded curvature path would lead the trailer 12 to a hitch angle γ that is beyond the maximum steerable angle, for example. As shown in FIG. 15, an illuminated warning indicator 274 may be used to communicate to the user that curvature routine 98 has determined that a commanded curvature could not be implemented and accordingly, that the actual curvature path for trailer 12 deviates from the selected curvature command 26. Further, a specific curvature limit indication 272 can also be selectively illuminated to show that the warning indicator 274 is signaling that the commanded curvature exceeds a determined limit. A similar curvature commanding indicator 270 and curvature limit indicator 272 can be included on knob 230 in a position corresponding to the right rotation range R(R), as also shown in FIG. 15.

In addition to the visual curvature limit indicators 272 described in the example of FIG. 15, knob 230 can provide haptic feedback to the user by way of electromechanical element 246. In one example, electromechanical element 246 can implement the vibratory movement mode 262, illustrated in FIG. 13, upon the control element 232 being rotated to a position that is determined by system 10 to ultimately result in a hitch angle γ that would exceed the maximum steerable angle, as discussed above. In such a scenario, further rotation of control element 232 may be possible; however, the commanded curvature path 26 would not increase and the warning indicator 274 would remain illuminated. Further, additional vibratory movements may be implemented by electromechanical element 246 as control element 232 is continued to be rotated, either at predetermined intervals or continuously with continued rotation of control element 232 beyond the determined maximum curvature path 26. It is noted that, as discussed above, the maximum curvature path 26 that system 10 will implement may depend on factors other than the geometry of the coupled trailer 12 and vehicle 14. In one example, the speed of vehicle 14 may factor into the determination of a maximum allowable curvature path 26, with the degree of curvature being limited at higher vehicle speeds to allow system 10 adequate time to react to the correspondingly faster dynamics of trailer 12. Accordingly, the position of control element 232 at which the curvature path is no longer increased and the haptic and visual warnings are implemented may vary.

In another example, the haptic feedback may be provided by electromechanical element 246 by simulation of physical end points of rotation in either the left range R(L) or the right range R(R) that may correspond to the calculated maximum curvature that can be commanded to keep hitch angle γ beneath the critical hitch angle γ$_c$, as calculated according to the procedure discussed above. In one example, this can be done by system 10 (such as by controller 28) causing electromechanical element 246, which may be in the form of a motor or the like, to exert a torque against the torque applied to control element 232 by the user. This can be done, for example, by using a PI controller or the like to cause control element 232 to provide an appropriate torque (264 in FIG. 15) to act against the user-provided torque at an appropriate location within the particular range of angular movement R(R) or R(L) away from the at-rest position in a manner that acts in a complementary manner with the controlled, simulated spring biasing torque also provided by electromechanical element 246. This type of scheme can allow the particular artificial end points to be adjusted in real-time by electromechanical element 246 according to the determination of the maximum curvature by system 10. In the alternative, knob 230 can further include an additional electromechanical element in the form of a lockout element 260, which may be a solenoid or the like, to engage with the teeth 258 of control element 232, for example, to prohibit further rotation of control element 232 past the determined endpoint. Still further, electromechanical element 246 may be coupled with one or more moveable stops to engage with a particular feature of control element 232, for example, to stop rotation thereof, in particular, in a direction away from the at-rest position P(AR) beyond a controllable curvature limit. In yet another example, an electromechanical element 246 that controls a gear or clutch mechanism operatively coupled between body 234 and control element 232 can manipulate the clutch or engage a particular gear or feature to establish the simulated physical end point.

Figure 16:
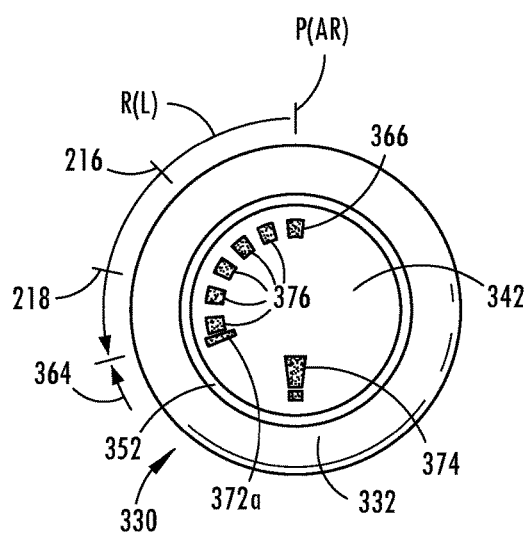
FIGS. 16 and 17 show a variation of the rotatable knob of FIG. 8A in use in selecting a curvature command and displaying information related to the selected curvature command and a determined end point of an associated range of motion.
Figure 17:
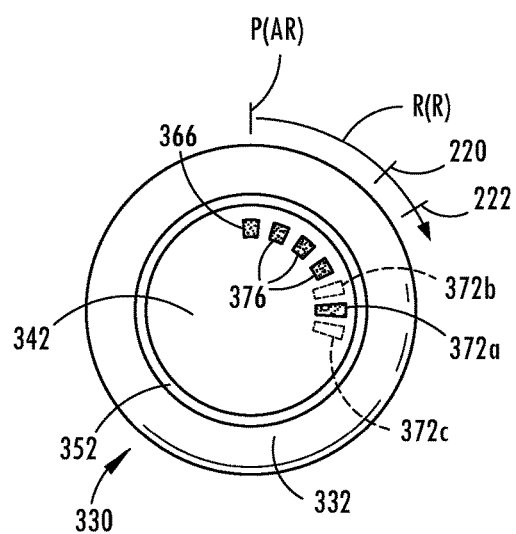

A further embodiment of a rotatable knob 330 is shown in FIGS. 16 and 17 that may include the same internal structure, including electromechanical element 246, illustrated in FIGS. 11 and 12 with respect to knob 230. As such, knob 330 may similarly be capable of providing simulated, adjustable physical end points of rotation thereof within opposing ranges R(R) and R(L) of biased movement away from an at-rest position, such biasing also being provided by electromechanical element 246 in a controlled manner, as discussed above. Knob 330 further includes a plurality of curvature command indicators 376 that can be illuminable sections within the body (which may be similar to body 234 of knob 2230 depicted in FIG. 14) of knob 330 or within button 342 thereof. In another embodiment the surface of the body or button 342 (whichever portion of knob 330 is exposed within the inner profile of control element 332) may include or be defined by a display element (e.g. a thin-film transistor ("TFT") display or the like) in which the curvature command indicators 376 can be graphical elements displayed thereon. The curvature command indicators 376 can be illuminated sequentially or progressively to correspond to the angle through which control element 332 has been rotated within either the right range of rotation R(R) or the left range of rotation R(L) during use of system 10. In sequential illumination, only the particular one of the indicators 376 corresponding to the current rotational position of control element 332 is illuminated, while in a progressive illumination mode, the ones of the indicators 376 that have been passed remain illuminated, including, optionally, the center position indicator 366 that corresponds to the at-rest position P(AR) of knob 330. Such a scheme allows for indication and visual feedback regarding the position of control element 332 regardless of the position thereof when a curvature routine 98 is activated.

As further shown in FIGS. 16 and 17, knob 330 can also include an illuminable curvature limit indicator 372a that can be illuminated to indicate the location of control element 332 that corresponds to the calculated maximum curvature that can be implemented by system 10 given the instantaneous parameters for the coupled trailer 12 and vehicle 14. Further, knob 330 can also include a warning indicator 374 that can be similar to that which is discussed above with respect to FIG. 15. As shown in FIG. 16, knob 330 can implement a balancing torque 364 to oppose a user-provided torque on control element 332 when the commanded curvature reaches the limit determined by system 10. As further illustrated in FIG. 17, knob 330 can include multiple illuminable curvature limit indicators 372a, 372b, and 372c, for example, that can be used to allow knob 330 to display a determined curvature limit in a manner that is adjustable in real-time to reflect dynamic changes in the curvature limit of system 10, as discussed above. In one aspect, the curvature limit can be displayed constantly by the particular one of curvature limit indicators 372a, 372b, or 372c, along with the current commanded curvature (by illumination of curvature indicators 376), as also shown in FIG. 17. In this manner, a user can visualize a remaining amount of curvature that can be commanded using control element 332 by comparing curvature indicators 376 to the presently-displayed one of the curvature limit indicators 372a, 372b, or 372c. Further, a knob 330 of the type described can allow the user to be made aware of the current curvature limit, as well as the effects of various factors (e.g. vehicle speed) on the curvature limit. In one example, curvature limit indicators 372 can be a combination of the illuminable area used for curvature indicators 376 and an additional area to give a larger appearance. In another example, the curvature limit indicators 372 can be achieved by the same feature as the curvature indicators 376, but illuminated in a different color (e.g. red).

Figure 18:
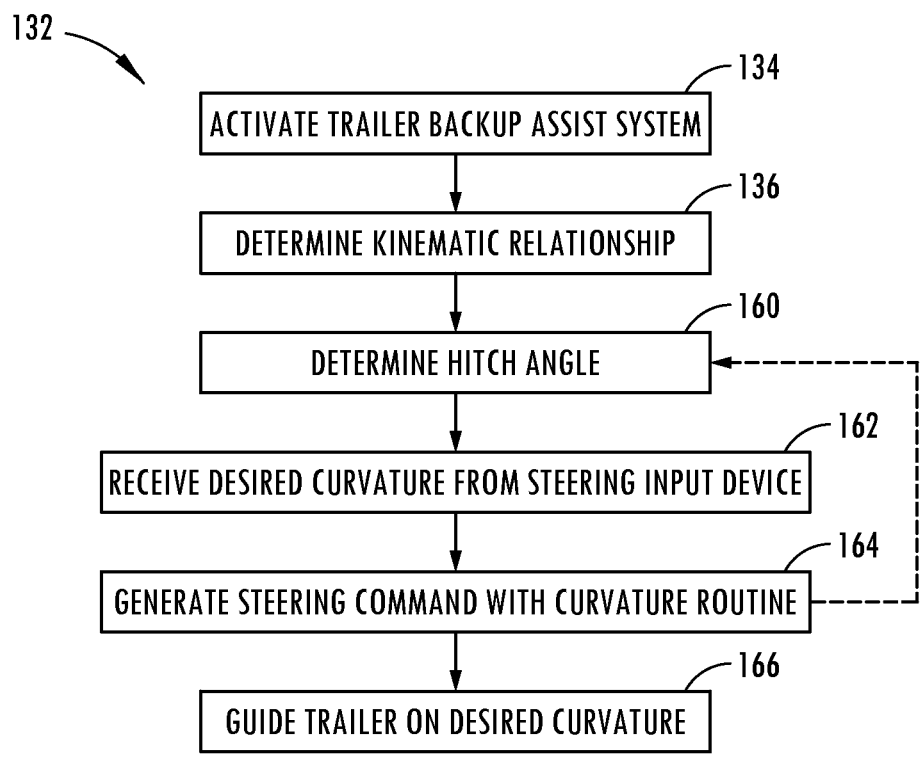
FIG. 18 is a flow diagram illustrating a method of estimating a hitch angle using a hitch angle estimation routine.

With reference to FIG. 18, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such a making navigating through a menu sequence on display 82 of the vehicle HMI 80 and confirming an initiation of the routine 132 using knob 30 or 230, as discussed above. The next step 136, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle by processing the hitch angle estimation routine 130.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A steering input system for a trailer backup assist system, comprising:
   an input element, including:
      a base;
      a rotary element rotatably coupled with the base; and
      an electromechanical element coupled between the base and the rotary element; and
   a controller causing the electromechanical element to constrain the rotary element to a first rotational movement mode by implementing a simulated biasing torque toward a center position of the rotary element from opposed ranges of motion about the center position with respect to the base and implementing a trailer backup assist mode including causing a vehicle to steer in a direction corresponding with a first instantaneous position of the rotary element within one of the opposed ranges of motion.

2. The steering input system of claim 1, wherein the simulated biasing torque increases with an increased rotational angle of the rotary element away from the center position within the opposed ranges of motion and decreases to zero with a decreased rotational angle of the rotary element toward the center position.

3. The steering input system of claim 1, wherein the controller further implements the trailer backup assist mode by interpreting the first instantaneous position of the rotary element as a trailer control commanding position and causing the vehicle to steer in the direction corresponding with the first instantaneous position by generating a vehicle steering command based on the trailer control commanding position.

4. The steering input system of claim 3, wherein:
- the trailer control commanding position corresponds to one of a zero curvature position or at least two directional curvature positions opposed about the zero curvature position;
- when the rotary element is constrained to the first rotational movement mode, the center position corresponds to the zero curvature position and the at least two directional curvature positions are included within the opposed ranges of motion; and
- the vehicle steering command is based on a trailer curvature path corresponding to an instantaneous one of the zero curvature position or one of the at least two directional curvature positions.

5. The steering input system of claim 3, wherein the controller further causes the electromechanical element to limit the opposed ranges of motion of the rotary element by prohibiting movement of the rotary element past respective first and second limits.

6. The steering input system of claim 5, wherein:
- the first limit corresponds to a calculated maximum steerable angle of a trailer coupled with a vehicle associated with the system on a side of the vehicle corresponding to a rotational direction of the rotary element; and
- the controller changes a rotational location of the first limit with respect to a change in the calculated maximum steerable angle.

7. The steering input system of claim 1, wherein the controller further causes the electromechanical element to implement a second rotational movement mode of the rotary element that includes free rotation thereof about the base.

8. The steering input system of claim 7, wherein, when implementing the second rotational movement mode, the controller causes the electromechanical element to simulate a plurality of detents within the free rotation at regular intervals.

9. A backup assist system for a vehicle reversing a trailer, comprising:
- an input element, including:
  - a base; and
  - a rotary element rotatably coupled with the base; and
- a controller causing a rotation of the rotary element relative to the base to be constrained in a first rotational movement mode including simulated biasing toward a center position from opposed ranges of motion about the center position and interpreting a first instantaneous position of the rotary element as a trailer control commanding position and outputting a vehicle steering command based thereon.

10. The backup assist system of claim 9, further including an electromechanical element coupled between the base and the rotary element, wherein:
- the controller causes the rotary element to implement the simulated biasing by way of a torque applied on the rotary element relative to the base in the first rotational movement mode by controlling the electromechanical element.

11. The backup assist system of claim 10, wherein the electromechanical element includes a motor.

12. The backup assist system of claim 10, wherein the controller further controls the electromechanical element such that the rotation of the rotary element is constrained in a second rotational movement mode of the rotary element that includes free rotation thereof about the base.

13. The backup assist system of claim 12, wherein, when implementing the second rotational movement mode, the controller causes the electromechanical element to produce a plurality of detents within the free rotation at regular intervals.

14. The backup assist system of claim 9, wherein:
- the trailer control commanding position corresponds to one of a zero curvature position or at least two directional curvature positions opposed about the zero curvature position;
- when the rotation of the rotary element is constrained in the first rotational movement mode, the center position corresponds to the zero curvature position and the at least two directional curvature positions are included within the opposed ranges of motion;
- the vehicle steering command is based on a trailer curvature path corresponding to an instantaneous one of the zero curvature position or one of the at least two directional curvature positions; and
- the input element illuminates at least one curvature indicator corresponding to the instantaneous one of the zero curvature position or one of the at least two directional curvature positions.

15. The backup assist system of claim 9, wherein:
- the controller further limits a range of motion of the rotary element by prohibiting movement of the rotary element in at least one of the opposed ranges of motion past a first limit by way of a simulated rotational endpoint; and
- the input illuminates a curvature limit indicator corresponding to the first limit.

16. The backup assist system of claim 15, wherein:
- the first limit corresponds to a calculated maximum steerable angle of the trailer relative to the vehicle on a side of the vehicle corresponding to a rotational direction of the rotary element; and
- the controller changes a rotational location of the first limit with respect to a change in the calculated maximum steerable angle.

17. A method for assisting a vehicle in reversing a trailer, comprising:
- causing a rotation of a rotary element relative to a base to which the rotary element is coupled to be constrained in a first rotational movement mode that is biased toward an at-rest position by a simulated biasing torque applied to the rotary element toward a center position of the rotary element from opposed ranges of motion about the center position with respect to the base;
- receiving a curvature command provided by the rotary element, the center position corresponding to a zero curvature position and two directional curvature positions being included within the opposed ranges of motion; and
- generating a steering command for the vehicle based on a degree of curvature and direction corresponding to the curvature command.

18. The method of claim 17, wherein the curvature command corresponds to a rotational position of rotation of the rotary element away from the at-rest position.

19. The method of claim 17, further including controlling an electromechanical element coupled between the base and the rotary element to constrain the rotation of the rotary element to within the first movement mode, including progressively applying the simulated biasing torque.

20. The method of claim 19, further including:
- causing the electromechanical element to permit the rotation of the rotary element to include free rotation of the rotary element about the base; and advancing a selection of a contextual menu item based on free rotation of the rotary element through a predetermined rotational distance.

\* \* \* \* \*